United States Patent [19]

Hardell, Jr. et al.

[11] Patent Number: 5,448,716

[45] Date of Patent: Sep. 5, 1995

[54] APPARATUS AND METHOD FOR BOOTING A MULTIPLE PROCESSOR SYSTEM HAVING A GLOBAL/LOCAL MEMORY ARCHITECTURE

[75] Inventors: William R. Hardell, Jr.; James D. Henson, Jr., both of Austin; Oscar R. Mitchell, Pflugerville, all of Tex.

[73] Assignee: International Business Machines Corporation, Armonk, N.Y.

[21] Appl. No.: 969,596

[22] Filed: Oct. 30, 1992

[51] Int. Cl.⁶ .......................... G06F 15/16; G06F 9/00
[52] U.S. Cl. ................... 395/550; 364/228.1; 364/DIG. 1; 364/271; 364/243.4; 364/270; 364/228.3; 395/200.19
[58] Field of Search ................. 364/200; 395/425, 27, 395/650, 550; 371/11

[56] References Cited

U.S. PATENT DOCUMENTS

| | | | |
|---|---|---|---|
| 4,377,000 | 3/1993 | Staab | 371/11 |
| 4,590,556 | 5/1986 | Berger et al. | 364/200 |
| 4,594,657 | 6/1986 | Byrns | 364/200 |
| 4,827,401 | 5/1989 | Hrustich et al. | 364/200 |
| 4,943,911 | 7/1990 | Kopp et al. | 364/200 |
| 4,965,717 | 10/1990 | Cutts, Jr. et al. | 364/200 |
| 5,050,072 | 9/1991 | Earnshaw et al. | 364/200 |
| 5,068,780 | 11/1991 | Bruckert et al. | 395/700 |
| 5,202,987 | 4/1993 | Bayer et al. | 395/650 |
| 5,204,938 | 4/1993 | Skapura et al. | 395/27 |
| 5,276,828 | 1/1994 | Dion | 395/425 |

FOREIGN PATENT DOCUMENTS 61-288262 12/1986 Japan .

OTHER PUBLICATIONS

IBM Technical Disclosure Bulletin, vol. 33, No. 9, Feb. 1991–"System Support for Multiprocessing Without An Atomic Storage", pp. 18–23.

Primary Examiner—Kevin A. Kriess
Assistant Examiner—Majid A. Banankhah
Attorney, Agent, or Firm—Casimer K. Salys

[57] ABSTRACT

An architecture and method for booting a multi-processor system having processor local memory and shared global memory, with shared global memory access managed by an atomic memory access controller and cache coherence managed by software. Reset circuits are used to synchronize to a master clock a commonly distributed start signal and processor individualized restart sequences, which reset circuit signals are distributed to reset both local and global memory. Global memory testing is assigned to a processor based upon its rate status in completing an internal test sequence. The systems and methods are particularly suited to booting a group of multiple but relatively independent processors. Furthermore, the practice of the invention facilitates booting of such system when one or more of the processors have been disconnected or failed.

11 Claims, 5 Drawing Sheets

APPARATUS AND METHOD FOR BOOTING A MULTIPLE PROCESSOR SYSTEM HAVING A GLOBAL/LOCAL MEMORY ARCHITECTURE

CROSS-REFERENCE TO RELATED APPLICATIONS

The present invention is related to U.S. Pat. No. 5,327,548 having common inventorship and assignee.

BACKGROUND OF THE INVENTION

The present invention relates generally to multiple processor computer systems. More particularly, the invention is directed to systems and methods for booting/starting/restarting/resetting a multiple processor system characterized by the presence of a shared global memory and a multiplicity of relatively independently operable processors having individualized resetting and booting resources.

Systems composed of multiple but coordinated processors were first developed and used in the context of mainframes. More recently, interest in multiple processor systems has escalated as a consequence of the low cost and high performance of microprocessors, with the objective of replicating mainframe performance through the parallel use of multiple microprocessors.

A variety of architectures have been defined for multi-processor systems. Most designs rely upon highly integrated architectures by virtue of the need for cache coherence. In such systems cache coherence is maintained through complex logic circuit interconnection of the cache memories associated with the individual microprocessors to ensure data consistency as reflected in the various caches and main memory.

A somewhat different approach to architecting a multi-processor system relies upon a relatively loose hardware level coupling of the individual processors, with the singular exception of circuit logic controlling access to the shared global memory, and the use of software to manage cache coherency. An architecture which relies upon software managed cache coherency allows the designer to utilize existing processor hardware to the maximum extent, including the utilization of the processor hardware integrated booting/starting/restarting/resetting resources. This independence of the processors also lends itself to multi-processor systems with accentuated levels of availability, in that such independence facilitates continuity of system operation in the presence of failures or removals of one or more processors. Coordination in the access to, and coherency with, a shared global memory is of course somewhat more difficult with such independence of processors.

A fundamental problem which arises with such individualized processor multi-processor systems involves the coordination to accomplish system wide booting. Not only are the multiple processors designed and configured to accomplish individualized starting, but such starting must also incorporate the effects of an asynchronous common start signal. The asynchronous signal is usually derived from the status of the power supply. The multi-processor system must also have resources to synchronize the processors undergoing individualized starting to a master clock, and devices and methods to insure initialization and testing of all the processor as well as the shared global memory. Accomplishing this in the face of a failure in one or more of the processors complicates the management of the booting operation, in that booting responsibilities cannot be permanently allocated to selected ones of the processors.

SUMMARY OF THE INVENTION

The present invention defines a multiple processor architecture and method of operation in which a plurality of processors having individual starting resources respond to a common start signal and master clock to boot not only their individualized processor resources but the system level global memory. Furthermore, the objectives are attained in the context of an architecture which boots notwithstanding a failure in or absence of one or more of the individualized processors.

In one form, the present invention involves apparatus for booting a multiple processor system having both processor local and shared global memory, wherein the processors have individualized means for starting, the system includes a means for generating a common starting signal to all processors, the system includes a master clock means for synchronizing the multiple processors, and the system includes a means for testing the local and global memory in synchronism with the master clock means and responsive to the common start signal. In another aspect, the invention is directed to methods which perform the steps defined by the apparatus.

A preferred embodiment of the invention involves a multiplicity of processors responsive to individualized off-chip sequencers for processor starting and testing. Each processor has a local memory and access to shared global memory through a non-blocking cross-point switch. Access to global memory is coordinated through an atomic memory access controller, while cache coherence is managed through software. A common start signal is generated in response to the status of a shared power supply and is synchronized to a master clock through reset circuits. The reset circuits also synchronize and coordinate the reset of the local and global memory. Testing of the global memory is accomplished by the first of the processors which reaches a defined state in a program load sequence, which status provides such first processor with access to the global memory while isolating other processors from such access.

The benefits and features of the architecture and methods to which the present invention pertains will be more clearly understood and appreciated upon considering the ensuing description of a detailed embodiment.

BRIEF DESCRIPTION OF HE PREFERRED EMBODIMENT

Figure 1A:
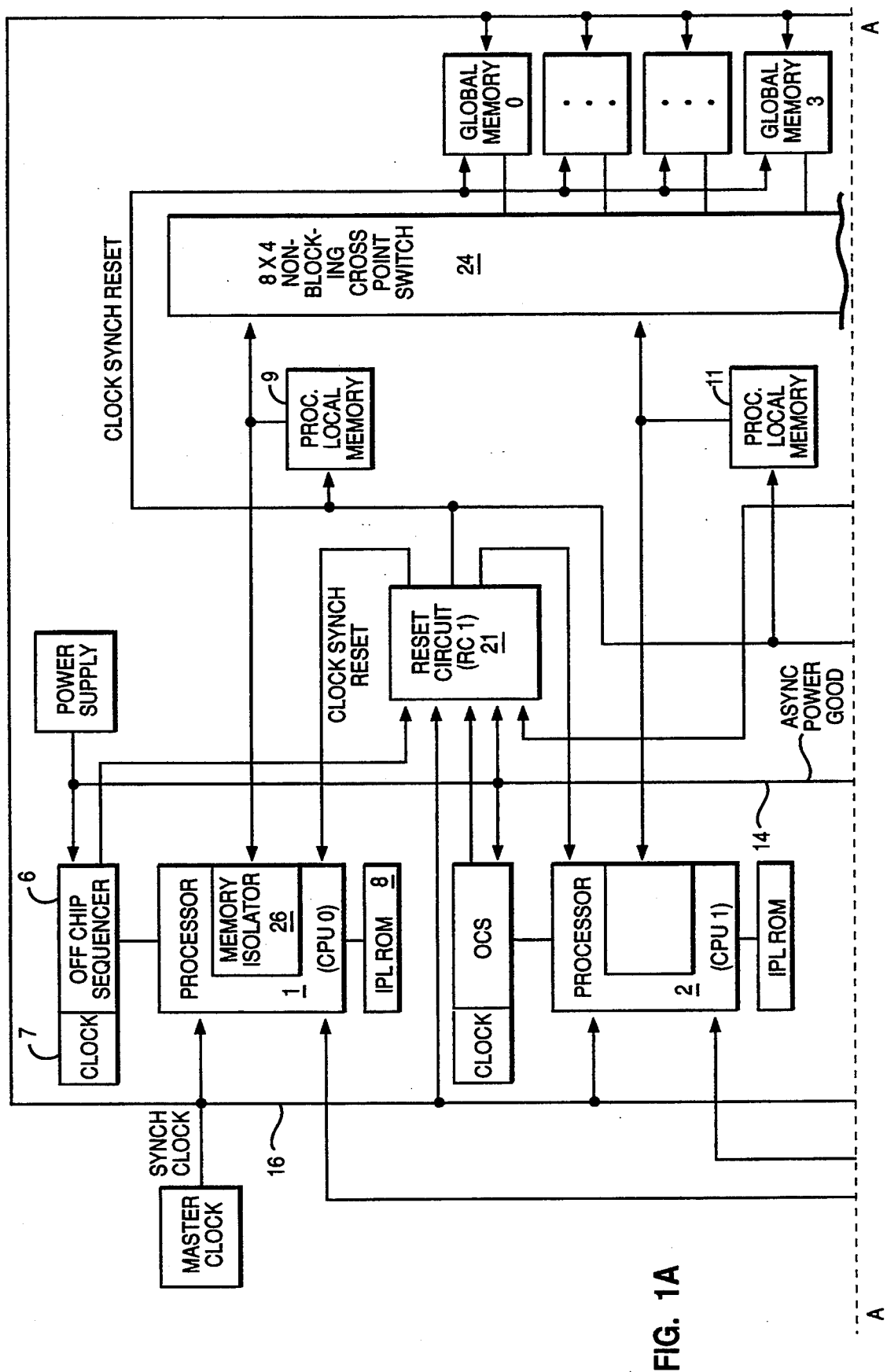
FIGS. 1A and 1B are schematic block diagram of a multi-processor system.
Figure 1B:
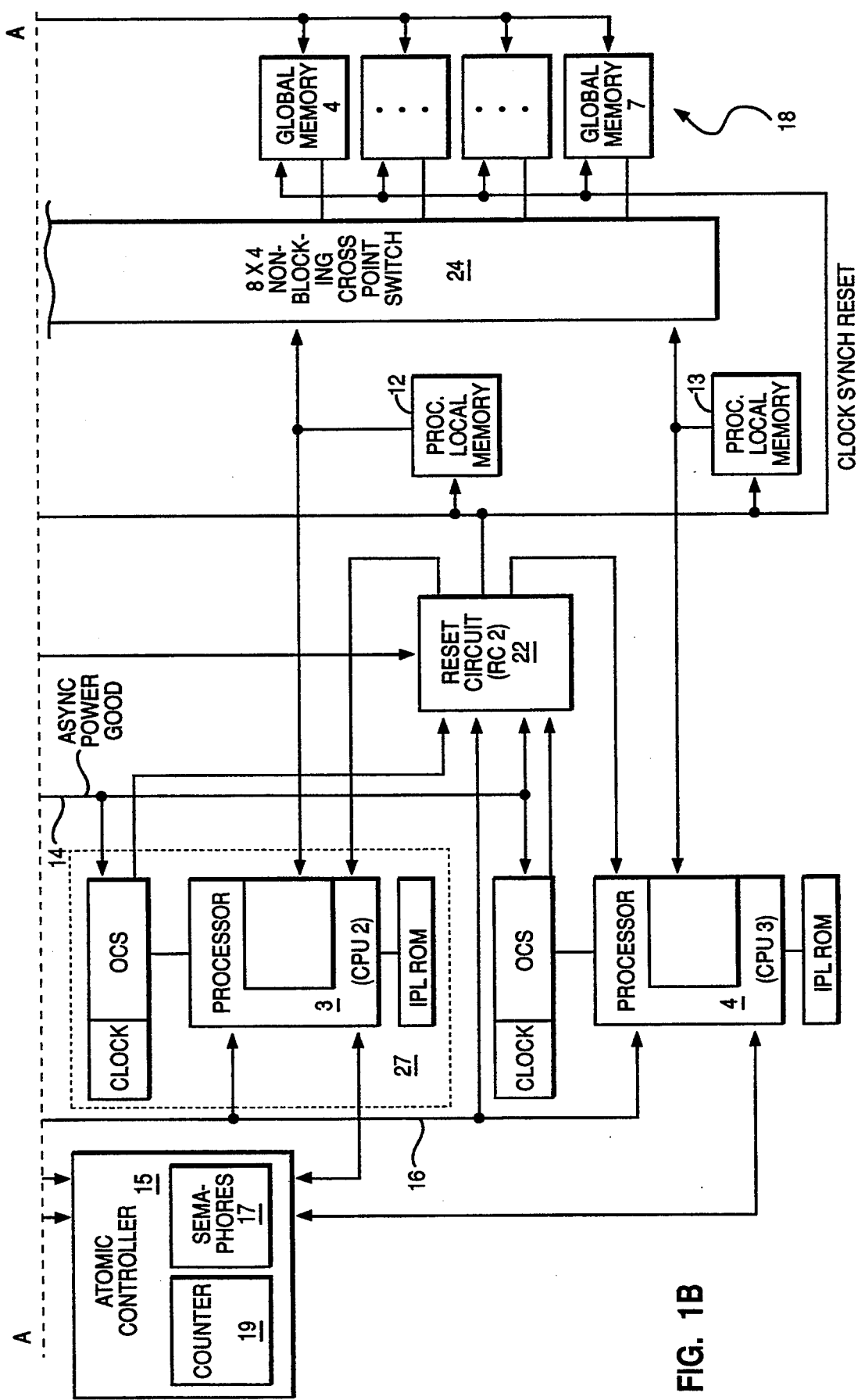

FIGS. 1A and 1B illustrate by schematic block diagram an architecture for the multi-processor system to which the present invention pertains. Included within the system are four processors, identified by reference numerals 1–4. A representative example of a processor is the RISC System/6000 workstation with associated AIX Operating System as is commercially available from IBM Corporation. Each processor includes an off-chip sequencer (OCS) 6 and clock 7, which together cycle the related processor through a sequence of reset and test conditions in anticipation of commencing the initial program load (IPL) to boot the operating system. As conventionally practiced, once the off-chip sequencer 6 completes its cycles, the initial program load (IPL) ROM 8 is accessed to commence the booting of the operating system from non-volatile storage such as hard disk (not shown). The multi-processor system in FIGS. 1A and 1B shows the presence of multiple such processors and their individually related starting systems. Associated with each processor 1–4 is a respective and locally addressable memory block, identified by reference numerals 9, 11, 12 and 13. Though not explicitly shown, each processor also includes a cache type memory for both instructions and data. As noted earlier, cache coherency is managed by software in a manner to be described hereinafter.

The creation of a multi-processor system from a multiplicity of individualized processor systems, including their related starting and memory resources, introduces the need for the other elements. For example, a power good signal on line 14 is distributed to all processor off-chip sequencers to initiate the start sequence. As would be expected, the power good signal on line 14 is asynchronous to the master clock signal on line 16. Therefore, the initiation of the off-chip sequencers and master clock do not coincident. This synchronization problem is further exacerbated by the fact that the embodying off-chip sequencers 6 are often synchronized to their own clocks 7.

Further aspects of the multi-processor system reside in atomic semaphores 17 of atomic controller 15, which allow software to coordinate accesses to the global memory array, generally at 18. The atomic semaphore controller uses lockable semaphore type registers. The atomic semaphore controller will only allow one processor at a time to acquire exclusive access to a semaphore register. However, different processors may own different semaphores at the same time, and each processor may own more than one semaphore at a time. Software uses the semaphores to select which processors can access different blocks of global memory. Software also uses cache flush cycles to maintain global memory coherence with respective processor caches. Atomic counter 19 is for purposes of the multi-processor system boot, used to select the processor which tests global memory array 18 for defects and the like.

Non-blocking cross-point switch 23 uses a relatively conventional design to allow processor 1–4 direct access to the whole of global memory array 18 in the absence of any address contentions. The processors are thereby able to concurrently communicate with the global memory.

The management of the boot operation for the multi-processor system in FIGS. 1A and 1B is accomplished through two reset circuits, reset circuit RC1 at reference numeral 21 and reset circuit RC2 at reference numeral 22. Though a single reset circuit would normally suffice, the embodiment utilizes two because of physical chip size constraints and to minimize timing skews within the system. Reset circuits 21 and 22 are cross-coupled to ensure that both parts of global memory array, namely banks 0–3 and 4–7, are reset at substantially identical times.

FIGS. 1A and 1B also show the presence of memory isolators 26, interposed between each processor and the memory bus extending to both the local and the global memory. Memory isolators 26 are used to selectively decouple the off-chip sequencing activities of the three processors which are not performing the global memory test. This avoids extraneous memory bus activity from reaching the global memory while the global memory is being tested by the single selected processor.

The multi-processor boot operation of the embodying system in FIGS. 1A and 1B begins with an asynchronously generated power good signal on line 14. The asynchronous power good signal initiates a multiplicity of asynchronous and individually clocked reset signals in the off-chip sequencers individually associated with each processor. The reset signals emanating from such off-chip sequencers are synchronized to the master clock signal on line 16 in reset circuits 21 and 22, wherein reset circuit 21 accomplishes the reset synchronization for processors 1 and 2 while reset circuit 22 does likewise for processors 3 and 4. The clock synchronized reset signals are conveyed to the respective processors. Also emanating from reset circuits 21 and 22 are clock synchronized reset signals directed to the respective local memories 9, 11, 12 and 13, as well as the respective portions of global memory array 18. In this way, the processors retain substantially independent booting or starting resources yet are synchronized to a common power good type start signal and individualized reset signals using a master clock.

Each off-chip sequencer cycles through multiple states during the course of testing its associated processor. Included within those states are multiple reset cycles which are again synchronized through reset circuits 21 and 22. Each off-chip sequencer concludes with the loading of the initial program load code from ROM 8, which code then initiates the loading of the operating system. As embodied, the initial program load code includes an instruction which directs the processor to read the data in counter 19 of atomic controller 15. Counter 19 is initialized to zero at power up and is incremented after each processor read. Reads by successive processors are serialized, so that no two read the same value. The 0 value identifies to the recipient processor that it is to test not only its own local memory but also the whole of the global memory. In contrast, processors reading non-zero values are directed to test only their respective processor local memories. The requirement that only one processor test the global memory during an interval of time is obviously important, while the selection of the first processor to read the counter draws upon practical considerations. Namely, since the off-chip sequencers are not synchronized, predicting which processor will commence IPL first is not practical. Furthermore, if one or more processors are inoperative, the original design goal requires that the system boot operation still be completed and that only a single processor will undertake to test the global memory.

In reflection, it should be apparent that this system defines an architecture and related method of operation whereby booting of the system is accomplished without regard to the asynchronous stature of the initiation signal, the asynchronous stature of processor individualized starting sequences, and without regard to the presence or absence of selected processors. For example, if the processor and related resources defined by dashed block 27 in FIG. 1 were inoperative, the remaining three processors would boot into a fully operative system in the normal manner.

Figure 2:
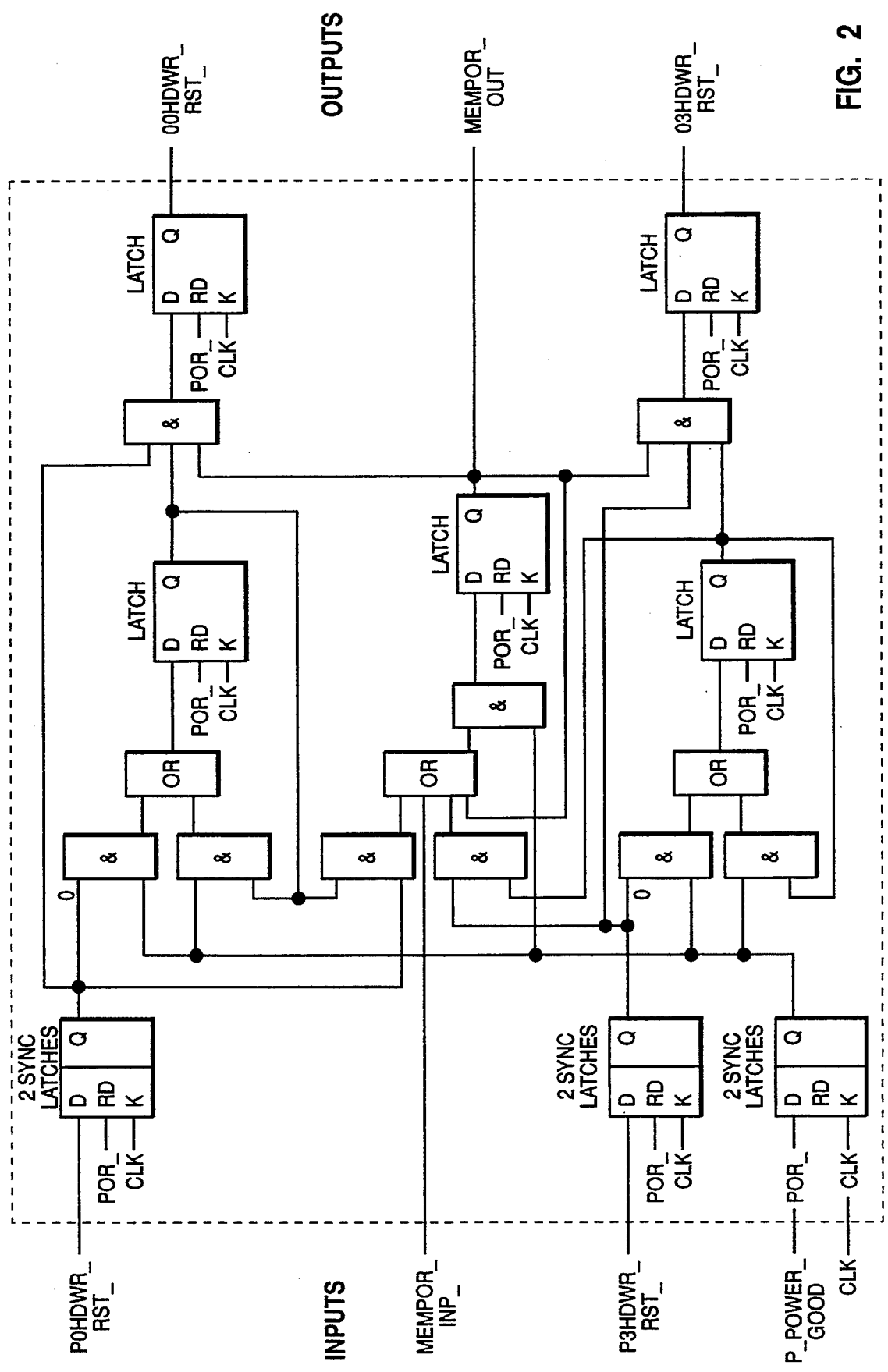
FIG. 2 is a block diagram showing the circuit functions embodied in a reset circuit.
Figure 3:
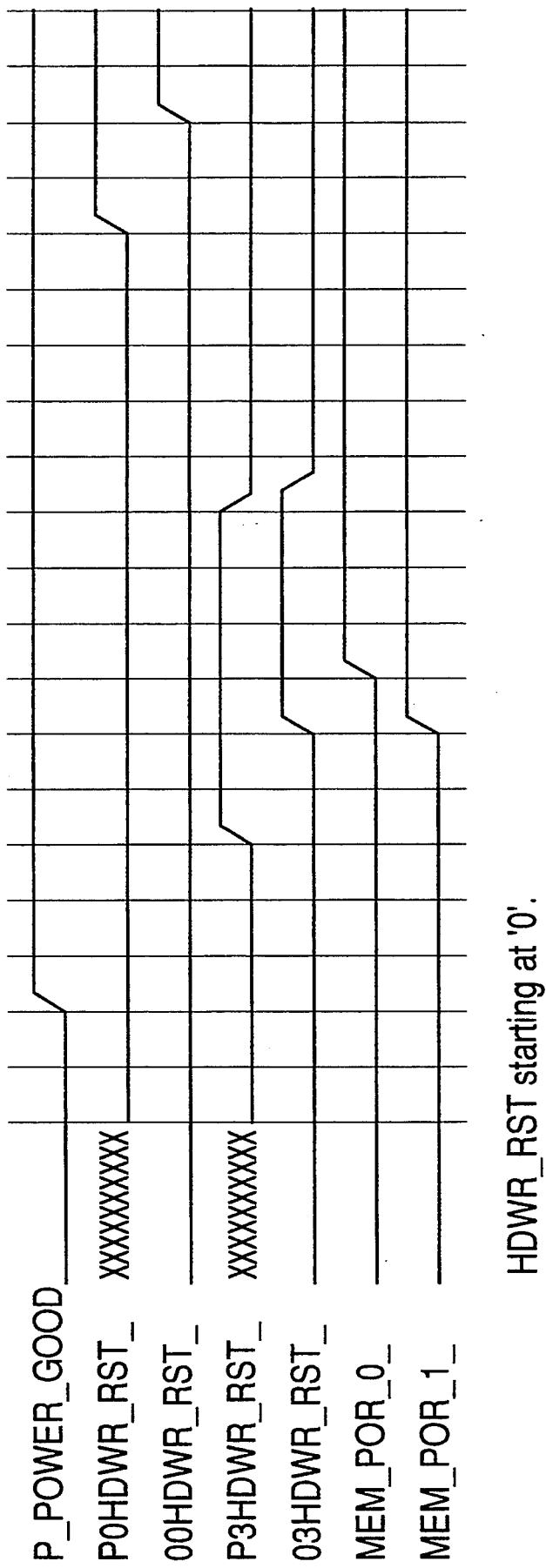
FIGS. 3 and 4 illustrate by waveforms the method by which the circuit operates to accomplish resetting and testing for two different hardware starting conditions.
Figure 4:
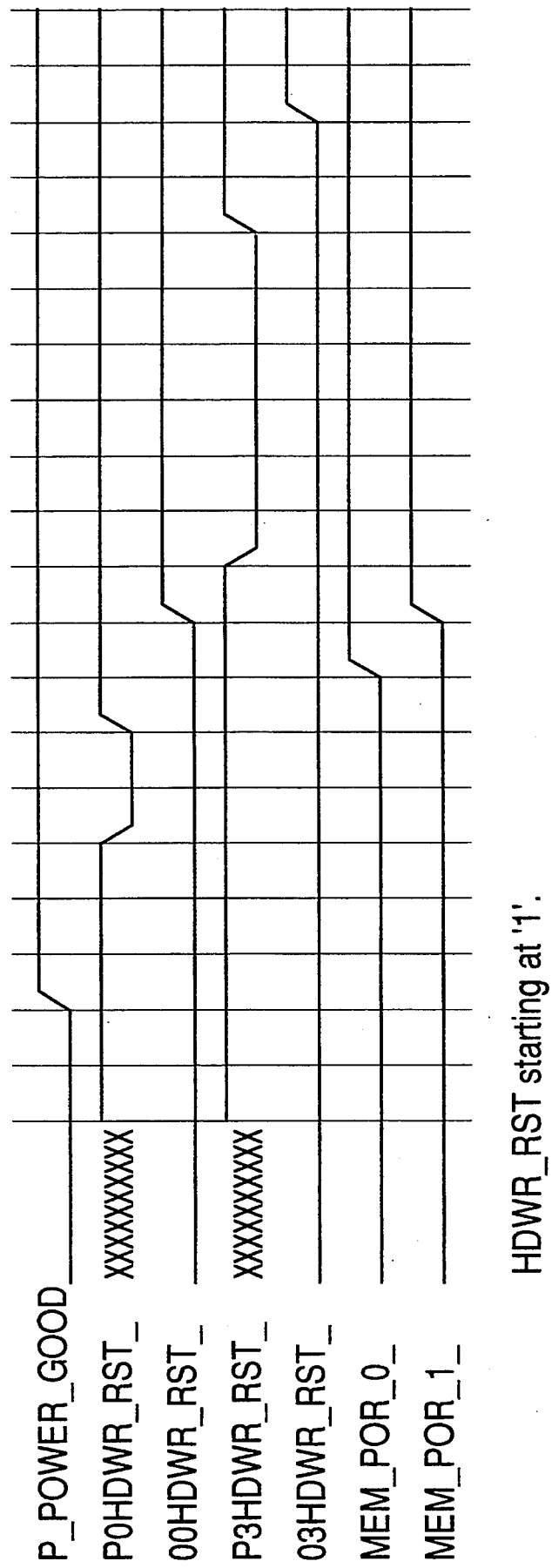

FIG. 2 schematically illustrates the logic internal to an embodying reset circuit. The various blocks are identified by function. The master clock and power good related power on reset (POR) signals are shown together with the inputs and outputs. The source, destination, and character of the input and output signals are defined in the headings of FIGS. 3 and 4. The timing relationships of the various signals are depicted in FIGS. 3 and 4. FIG. 3 illustrates the waveforms when the hardware reset signal starts at a low level. On the other hand, FIG. 4 illustrates the states of the various signals when the hardware reset starts in a high state.

The architecture and method of operation defined by the present invention not only synchronize various asynchronously occurring boot type signals for a multi-processor system having processor local and shared global memory, but accomplishes these objectives with extenuated flexibility. Namely, booting is accomplished with processors having independent starting sequencers, provides master clock synchronized local and global memory reset, and defines a process for selecting a processor to test the global memory. Foremost, these objectives are attainable with one or more processors disconnected.

Though the invention has been described and illustrated by way of a specific embodiment, the systems and methods encompassed by the invention should be interpreted consistent with the breadth of the claims set forth hereinafter.

What is claimed is:

1. Apparatus for booting a complete multi-processor system having individual processors, individual processor local memory, and a global memory, comprising:
   means for distributing a common power on signal to each processor;
   means for individually starting each processor responsive to the power on signal;
   means for synchronizing any steps which individually start each processor to a master clock;
   means for consistently selecting at least one processor to test both the global memory and such selected processor's local memory; and
   means for the selected processor to test the global memory in synchronism with the master clock.

2. The apparatus recited in claim 1, wherein the means for individually starting generates start sequence signals for each processor asynchronously.

3. The apparatus recited in claim 2, wherein the generated start sequence signals step each processor through a multiple stage individually clocked start sequence.

4. The apparatus recited in claim 3, wherein the means for the selected processor to test the global memory synchronizes the global memory reset and the global memory test signals to the master clock.

5. The apparatus recited in claim 1, further comprising:
   means for selecting one processor to test the global memory.

6. The apparatus recited in claim 5, further comprising:
   means for decoupling nonselected processors from global memory during the test of global memory.

7. A method of booting a complete multi-processor system having individual processors, individual processor local memory, and a global, memory comprising the steps of:
   distributing a common power on signal to each processor;
   starting each processor individually responsive to the power on signal;
   synchronizing any steps which individually start each processor to a master clock;
   consistently selecting at least one processor to test both the global memory and such selected processor's local memory; and
   testing the global memory by the selected processor in synchronism with the master clock.

8. The method recited in claim 7, wherein the step of starting each processor individually involves a generating of an asynchronous start sequence for each processor.

9. The method recited in claim 8, wherein the generated asynchronous start sequence signals step each processor through a multiple stage individually clocked start sequence.

10. The method recited in claim 9, wherein the step of testing the global memory by a processor comprises synchronizing the global memory test signals and reset signals to the master clock.

11. The method recited in claim 7, further comprising the step of:
   selecting one processor to test the global memory.

* * * * *